United States Patent [19]
Foust et al.

[11] Patent Number: 5,846,109
[45] Date of Patent: Dec. 8, 1998

[54] OXYGEN CONTROL AGENTS FOR FLUORESCENT LAMPS

[75] Inventors: Donald Franklin Foust, Scotia; Deborah Ann Haitko; David Key Dietrich, both of Schenectady, all of N.Y.

[73] Assignee: General Electric Company, Schenectady, N.Y.

[21] Appl. No.: 724,588

[22] Filed: Sep. 30, 1996

[51] Int. Cl.⁶ ...................................................... H01J 61/00
[52] U.S. Cl. .............................................. 445/2; 313/553
[58] Field of Search .................................. 445/2, 41, 55; 313/553

[56] References Cited

U.S. PATENT DOCUMENTS

| | | | |
|---|---|---|---|
| 3,657,589 | 4/1972 | Della Porta et al. | 445/55 |
| 3,833,399 | 9/1974 | Martyn et al. | 313/489 |
| 4,032,813 | 6/1977 | Shurgan et al. | 313/492 |
| 5,229,686 | 7/1993 | Fowler et al. | 313/565 |
| 5,229,687 | 7/1993 | Fowler et al. | 313/565 |

*Primary Examiner*—Kenneth J. Ramsey
*Attorney, Agent, or Firm*—James Magee, Jr.; Douglas E. Stoner

[57] ABSTRACT

The formation of leachable mercury upon disposal or during TCLP testing of mercury vapor discharge lamps is substantially prevented by incorporation in the lamp structure or in the test solution of an oxygen scavenger.

2 Claims, No Drawings

OXYGEN CONTROL AGENTS FOR FLUORESCENT LAMPS

This invention is directed to mercury vapor arc discharge lamps in which the arc discharge takes place in mercury vapor, including conventional phosphor fluorescent lamps and more particularly to avoidance mercury pollution of landfill and groundwaters upon disposal of such lamps. The lamps provided herein are characterized by reduced solubilization and leaching of mercury when the lamp is pulverized for testing or upon disposal.

BACKGROUND OF THE INVENTION

Low pressure mercury arc discharge lamps are standard lighting means which include electrodes sealed in a glass envelope, the interior of which may be coated with a phosphor. The lamp also contains a small amount of mercury and an inert gas at low pressure, of about 1 to 5 torr. The term lamp, as used herein, means the complete unit including the glass envelope and the end pieces and plugs for mounting in a lamp fixture, and wires which connect the internal components of the envelope with the end pieces.

During manufacture of fluorescent or low pressure mercury arc lamps an amount of elemental mercury ($Hg^0$) is sealed in the lamp envelope. Most of the mercury adheres to the phosphor coating, a small amount being in the vapor phase.

During operation, alkali metal carbonates from the electrodes decompose and form free oxygen in the lamp. The oxygen can react with a portion of the mercury to form soluble mercury oxide (HgO). Soluble mercury oxide is leachable from land fills and other disposal facilities. Soluble mercury oxides or other oxidized forms of mercury formed in the course of the test are detrimental to the reliability of the standard test for determination of the leachability of toxic materials from lamp waste.

There is concern about the environmental impact of this soluble form of mercury oxide if it leaches into ground water sources, rivers, streams, and the like.

SUMMARY OF THE INVENTION

Ferric and cuprous ions form soluble compounds which are capable of oxidizing elemental mercury to the monovalent, mercurous, form which is soluble in an acidic aqueous environment and therefore leachable. The formation of ferric and cuprous compounds depend on exposure to and reaction with oxygen. Oxygen scavengers incorporated in the lamp prevent dissolution of iron and copper from lamp components thereby greatly reducing or preventing the formation of leachable mercurous and mercuric compounds by oxidation of elemental mercury.

The invention provides a mercury vapor discharge lamp comprising an envelope of light transmitting glass which contains, an inert gas and an amount of elemental mercury, a pair of electrodes for establishing an arc discharge, and an effective amount of an oxygen control agent.

The lamp further comprises at least one base or end cap which defines a cavity having an inner surface, and which is secured to the lamp envelope by a baseing cement, the oxygen scavenger being disposed within said cavity. Generally such lamps have a pair of end caps.

The oxygen scavenger is admixed with the baseing cement securing the end caps in place on the glass envelope.

In a preferred embodiment of the invention, the mercury vapor discharge lamp is provided with oxygen scavenger carried on the inner surface of the cavity by means of an inert water soluble binder.

DESCRIPTION OF THE INVENTION

The incorporation of oxygen control agents in a lamp structure or to the test solution decreases the oxygen available for oxidation of metal components to a form which is both soluble and capable of oxidizing elemental mercury to a soluble form of mercury oxide. Accordingly the formation and dissolution of soluble ferric and cuprous compounds from the lamp components is diminished or prevented resulting in reduction or prevention of leachable mercury compounds.

The formation of leachable mercury when fluorescent lamps are broken and exposed to landfill conditions can be prevented or minimized by preventing oxidation of certain components of the lamp. Certain metal components of fluorescent lamps particularly iron lead wires, copper coated leads, and any brass components generate ferric ($Fe^{+3}$) and cuprous ($Cu^{+1}$) ions when exposed to moisture, oxygen, and acidity.

In order to address the growing concern that excessive amounts of mercury from disposal of fluorescent lamps might leach into surface and subsurface water, the Environmental Protection Agency has established a maximum concentration level for mercury at 0.2 milligrams of leachable mercury per liter. This is generally determined by a standard analysis known as the Toxicity Characteristic Leaching Procedure (TCLP), a well known test procedure.

In carrying of the TCLP test, the lamps are pulverized to form lamp waste material similar to that which would result from lamp disposal in land fills or other disposal locations. The ambient conditions in such locations may be such as to promote formation of leachable mercury just as the TCLP test conditions themselves tend to allow for formation of leachable mercury in amounts greater than the established limit of 0.2 milligrams per liter.

It has been found that elemental mercury added to mercury-free pulverized lamp materials prepared for the TCLP test is converted to leachable mercury in the course of the test. If elemental mercury alone or in combination with various glass, phosphor, or non-metal lamp components is tested, little or essentially no leachable mercury is found. When elemental mercury is tested in combination with metal lamp components such as copper or iron, lead wires, pins, or other metal hardware, the mercury is transformed into a leachable form.

It was determined by controlled experimentation that both ferric iron (trivalent) and cuprous monovalent copper are generated under the TCLP test conditions when carried out in the presence of oxygen and that these ionic species are able to oxidized elemental mercury to soluble mercury compounds which are measured as leachable mercury.

Corrosion or dissolution of metals from the metallic state requires the presence of both oxygen and a solvent such as water conditions that exist in the TCLP test and landfill situations. Accordingly, it has been found that the formation can be controlled or prevented by controlling or excluding exposure to oxygen of the iron and copper-containing metal lamp components. This can be done by the use of oxygen-free or anaerobic test and disposal conditions.

Oxygen scavengers incorporated into fluorescent lamps during manufacture become operative in the course of preparing lamps for the TCLP test or upon destruction of the lamp during disposal. The presence of such oxygen scavengers will make the TCLP test more reliable and will reduce the formation of soluble mercury compounds when the lamps are disposed of.

Suitable oxygen scavengers include any materials, compounds, or systems which make oxygen unavailable to the mercury-containing environment. Illustrative scavengers include iron powder, sodium dithionite, ammonical cuprous chloride and chromous sulfate. Sodium sulfite is a preferred oxygen scavenger for use in this invention.

The principles and practice of this invention will be more fully understood when considered in view of the following examples.

All TCLP test data was obtained by the test procedure prescribed on pages 26987–26998 volume 55, number 126 of the Jun. 29, 1990 issue of the Federal Register.

Briefly, lamps being tested are pulverized into particulate form having the prescribed particle size which is capable of passing through 3/8 inch sieve. The test material is then extracted with a sodium acetate-acetic acid buffer at a pH of about 4.93.

To prevent the spurious formation of leachable mercury upon disposal of mercury vapor discharge lamps and to improve the reliability of the TCLP test an effective amount of an oxygen scavenger material is incorporated in the lamp structure for example within the glass envelope exterior to the plasma discharge or in an end-cap, or in the base of the lamp. An effective amount of the oxygen scavenger is that amount which will consume sufficient oxygen to substantially prevent formation of ferric and cupric compounds which can oxidize elemental mercury to a soluble form. In general, an effective amount of the scavenger will be enough for the TCLP test results to show the presence of less than about 0.2 parts per million of leachable mercury.

The formation of soluble mercury compounds is illustrated by the data in Table 1, below. Carrying out the TCLP test in the presence of air generates about 1 part per million of copper and about 0.3 parts per million of soluble iron. The amount of soluble mercury formed under these conditions exceeds the regulatory limit of 0.2 parts per million. Increasing the exposure to oxygen increases the amount of soluble copper and soluble mercury formed. Decreasing exposure to oxygen decreases the formation of soluble copper and soluble mercury.

TABLE 1

| Gas Type | Soluble Cu ppm | Soluble Hg ppm |
|---|---|---|
| Air | 1.07 | 0.777 |
| Argon | 0.06 | <0.050 |
| Oxygen | 3.04 | 1.030 |

When the amount of oxygen is varied by increasing the volume of the head space in the TCLP test jar, the effect of both soluble iron and copper on the formation of soluble mercury is evident from the data in Table 2, below. As the head space volume increases, the amount of soluble mercury increases in response to the formation of increasing amounts of soluble copper and iron.

TABLE 2

| Head Space (mL) | Soluble Mercury (ppb) | Soluble Iron (ppm) | Soluble Copper (ppm) |
|---|---|---|---|
| 0 | 0.0000 | 210 | 3.62 | 0.35 |
| 1 | 140 | 214 | 4.63 | 0.40 |
| 2 | 205 | 203 | 5.04 | 0.63 |
| 3 | 360 | 250 | 5.22 | 0.43 |

TABLE 2-continued

| Head Space (mL) | Soluble Mercury (ppb) | Soluble Iron (ppm) | Soluble Copper (ppm) |
|---|---|---|---|
| 4 | 494 | 311 | 5.22 | 0.51 |
| 5 | 763 | 525 | 6.13 | 1.04 |
| 6 | 1013 | 458 | 5.80 | 1.02 |
| 7 | 1508 | 583 | 8.12 | 1.13 |

When an oxygen scavenger such as finely divided iron metal or sodium sulfite is added to the test solution, the formation of soluble mercury is decreased as shown in Table 3, below.

TABLE 3

| Additive | Hg Dose (mg/lamp) | Amount of Additive (gms/lamp) | ORP* | Final pH | Leachable Hg(ppb) |
|---|---|---|---|---|---|
| none | 21.2 | — | — | — | 745 |
| $Na_2SO_3$ | 20.2 | 10 | −70 | 5.05 | <50 |
| $Fe^0$ | 20.0 | 2.0 | 97 | 5.20 | <50 |

*ORP = Oxidation Reduction Potential

Table 3 shows examples of oxygen scavengers that have been added to the TCLP extraction to study the effect upon leachable mercury. The first entry is a control showing the expected amount of leachable mercury generated when the pulverized lamp is dosed with 20 mg of elemental mercury. The leachable mercury generated in that case is 745 ppb in the absence of any oxygen scavenger.

The oxygen scavenger can be incorporated in the lamp encapsulation of the material in a glass capsule that can be placed either in the base of the lamp between the aluminum cap and flare of leaded glass, or placed within the positive column of the lamp. Since the oxygen scavenger is enclosed in a glass capsule it could be present in the inside or positive column of the lamp without affecting lamp function.

The oxygen scavenger material can also be incorporated in the basing cement of the lamp that holds the aluminum cap to the leaded glass portion of the end of the lamp. The basing cement generally comprises about 80 weight % marble flour (limestone-CaO), and the balance shellac a phenolic resin binder, a solvent for blending, and a dye used to color the cement. The cement is dispensed through a feeder into the base and heated to cure once assembled with the lamp. The curing drives off the solvent and solidifies the cement. The oxygen scavenger is blended with the cement components and incorporated into a lamp manually or by automated manufacturing equipment. The scavenger material is released only when the lamp is destroyed or crushed in preparation for TCLP testing. In this method the active scavenger material is always exterior to the positive column of the lamp.

Another method for incorporating the active scavenger material in the lamp structure is admix it with an inert water soluble adhesive carrier or binder. Gums and gelatins have been used as such adhesives and binders. The nature of the gums and gelatins is that they adhere to surfaces when heated. The composition containing the scavenger material can be placed on the inner surface of the aluminum end cap as a ring or discrete button. When the lamp is crushed and exposed to an aqueous environment or placed in the TCLP solution, the water soluble binder allows the oxygen scavenger to be released quickly.

What is claimed is:

1. A method for preventing the formation of leachable mercury compounds in mercury vapor discharge lamps which comprises incorporation into the lamp structure of an effective amount of an oxygen scavenger is iron powder, sodium sulfite, or sodium dithionite in an amount of about 0.1 to about 15 grams per lamp admixed with an inert water soluble binder.

2. A mercury vapor discharge lamp comprising an envelope of light transmitting glass which contains an inert gas and an amount of elemental mercury, a pair of electrodes for establishing an arc discharge, at least one base cap defining a cavity and an effective amount of an oxygen scavenger is carried on the inner surface of the cavity by means of a water soluble binder, said oxygen scavenger being iron powder, sodium sulfite, or sodium dithionite in an amount of from about0.1 to about 15 grams per lamp.

* * * * *